United States Patent
Atarius

(10) Patent No.: US 8,571,524 B2
(45) Date of Patent: Oct. 29, 2013

(54) METHOD AND APPARATUS FOR DELIVERY CONFIRMATION OF A MESSAGE

(75) Inventor: Roozbeh Atarius, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 996 days.

(21) Appl. No.: 12/366,315

(22) Filed: Feb. 5, 2009

(65) Prior Publication Data

US 2009/0197622 A1    Aug. 6, 2009

Related U.S. Application Data

(60) Provisional application No. 61/026,682, filed on Feb. 6, 2008.

(51) Int. Cl.
*H04M 1/725* (2006.01)
*H04M 11/00* (2006.01)
*H04W 4/00* (2009.01)

(52) U.S. Cl.
USPC ............. 455/412.1; 455/466; 379/100.06

(58) Field of Classification Search
USPC ............... 455/412.1, 412.2, 466; 379/100.06–100.09; 709/206
See application file for complete search history.

(56) References Cited

U.S. PATENT DOCUMENTS

| | | | |
|---|---|---|---|
| 6,996,520 B2 * | 2/2006 | Levin | 704/10 |
| 7,120,455 B1 | 10/2006 | Chen et al. | |
| 7,290,041 B2 | 10/2007 | Mendiola et al. | |
| 2003/0208545 A1 | 11/2003 | Eaton et al. | |
| 2004/0152477 A1 * | 8/2004 | Wu et al. | 455/466 |
| 2004/0249891 A1 * | 12/2004 | Khartabil et al. | 709/206 |
| 2005/0282565 A1 | 12/2005 | Shaheen | |
| 2006/0168037 A1 * | 7/2006 | Audu et al. | 709/206 |
| 2006/0268839 A1 * | 11/2006 | Kato | 370/352 |
| 2007/0032251 A1 * | 2/2007 | Shaheen | 455/466 |
| 2009/0164587 A1 * | 6/2009 | Gavita et al. | 709/206 |

FOREIGN PATENT DOCUMENTS

| | | |
|---|---|---|
| CN | 1801962 A | 7/2006 |
| CN | 101052017 A | 10/2007 |
| JP | 2003526989 A | 9/2003 |
| JP | 2007516671 A | 6/2007 |
| JP | 2008535120 A | 8/2008 |

(Continued)

OTHER PUBLICATIONS

International Search Report and Written Opinion—PCT/US2009/033324, International Search Authority—European Patent Office—May 26, 2009.

*Primary Examiner* — Kiet Doan
*Assistant Examiner* — Scott Au
(74) *Attorney, Agent, or Firm* — James T. Hagler

(57) ABSTRACT

A system and method for delivery confirmation of a short message comprising sending the short message to an recipient communication device, determining that an instant message delivery notification (IMDN) is not received, and indicating delivery failure of the short message to the mobile station. In another aspect, if a 202 Accepted message is received, the IM server is subscribed to. Alternatively when a message indicating that an recipient communication device is reachable is received, the service center sends the short message to the communication device. In another alternative, if a recipient absence notification is received the short message is buffered in a service center until the service center receives notification that the recipient communication device is present. Upon receipt of the notification, the service center retransmits the short message, and a successful delivery report is sent when the short message is received by the recipient communication device.

10 Claims, 11 Drawing Sheets

(56) References Cited

FOREIGN PATENT DOCUMENTS

| | | | |
|---|---|---|---|
| KR | 20060092944 A | 8/2006 | |
| WO | WO0167622 A2 | 9/2001 | |
| WO | WO0207396 A1 | 1/2002 | |
| WO | WO2005054991 A2 | 6/2005 | |
| WO | WO2006107181 A1 | 10/2006 | |

* cited by examiner

METHOD AND APPARATUS FOR DELIVERY CONFIRMATION OF A MESSAGE

RELATED APPLICATIONS

The present application claims the benefit of priority to U.S. Provisional Patent Application No. 61/026,682 filed Feb. 6, 2008, the entire contents of which are hereby incorporated by reference.

FIELD OF THE INVENTION

The present invention relates generally to computer communication technologies, and more particularly to a system and method for providing a delivery confirmation of short messages transmitted across two different communication protocols.

BACKGROUND

In mobile communications systems, the Short Message Service (SMS) transfers short messages between an initiating user's communication device ("IUMD" in the figures) and an intended recipient user's communication device ("IRUMD" in the figures) via a service center ("SC" in the figures). The service center serves as an interworking and relaying function for the message transfer between the IUMD and IRUMD. There are two basic services associated with the short message point-to-point services: SM MT (short message mobile terminated) and SM MO (short message mobile originated). In SM MT, the system transfers a short message from the service center to a mobile station. In SM MO, the system transfers a short message from the IUMD to IRUMD via a service center. In either case, the system provides information about the delivery of the short message either by a delivery report or a failure report. The text messages transferred by the short messages contain up to 140 octets (bytes).

One of the primary characteristics of the SMS system is that it is a store and forward communication system. Thus, a SMS communication system does not rely on real-time connectivity between the sender and the receiver. A SMS message can be transmitted to a recipient at any time, even when the recipient's communication device (mobile station or short messaging entity) is turned off or otherwise not logged into the system. An active mobile station can receive a short message (SMS DELIVER) at any time, independently of whether or not there is a speech or data call in progress. If a recipient mobile station was turned off when a message was initially sent, it will receive the message as soon as it is activated and logged onto the communication network. A report is returned to the service center confirming that the mobile station has received the message or not. Similarly, an active mobile station is able to submit a short message (SMS-SUBMIT) at any time, independently of whether or not there is a speech or data call in progress. A report is always returned to the mobile station, confirming that the service center has received the message or not. Similar reporting is provided for other types of messaging systems, such as multimedia message system (MMS) messages.

When the service center sends a pager mode type instant message (IM) the message may not be delivered to the intended recipient user, depending on the intended recipient user's status. For example, if the intended recipient user is offline an IM message will not be delivered because the IM system protocol is not a store-and-forward communication system. On the other hand, if an IM message is forwarded on to a recipient on a SMS communication system, the mechanism for conveying the message across the two communication protocols, referred to generally herein as a protocol-to-protocol interface gateway, can result in a false delivery indication. For example, to convey an IM message through a SMS system, the IM message may be forwarded via an instant messaging protocol (IM) to short message (SM) protocol interface gateway (IP-SM-GW). If the recipient mobile device is offline at the time, the IM message may be forwarded to an IM server/storage by the IP-SM-GW until the user is available. In this case the IM server/storage sends a 2xx status message (Success message), for example, 202 ACCEPTED message, to the IP-SM-GW indicating that the IM message has been received. In response the IP-SM-GW will generate a Delivery Acknowledgement message which is sent to the IM originator. However, this delivery acknowledgement is erroneous because it does not represent the true state of the intended recipient user (i.e., intended recipient user or intended recipient user equipment IRUE) in many cases. This false delivery acknowledgement is a problem that limits the usefulness of communicating non-store-and-forward type messages over store-and-forward communication systems.

SUMMARY

Disclosed is an apparatus and method for delivery confirmation of a message communicated across a communication protocol interface in which a first protocol presumes the recipient is on-line or registered and a second protocol which delivers messages when requested or logged in. When messages are delivered between protocols which differ in the delivery mechanisms or recipient registration presumption the operation of a protocol interface module can cause delivery confirmation errors. The various embodiments reduce or eliminate this problem, thereby enabling reliable inter-protocol communications.

According to one aspect, a method for delivery confirmation of a short message includes sending the message in a short message service protocol addressed to the intended recipient's communication device, relaying the message to the intended recipient user's communication device in an instant messaging protocol, determining whether the intended recipient's communication device has returned an instant messaging delivery notification (IMDN), and indicating delivery failure of the message if the instant messaging delivery notification has not been returned.

According to another aspect, a method for delivery confirmation of a short message includes sending the message in a first protocol format addressed to the intended recipient's communication device, relaying the message to the intended recipient user's communication device in a second protocol format, determining whether the intended recipient's communication device has returned a delivery confirmation in the second protocol format, storing the message in a second protocol server if the delivery confirmation in the second protocol format has not been returned, subscribing to the second protocol server for notification of delivery confirmation in the second protocol format, receiving a notification that the intended recipient's communication device is available, relaying the stored message from the second protocol server to the intended recipient's communication device after receiving the notification that the intended recipient's communication device is available, receiving the delivery confirmation from the intended recipient's communication device in the second protocol format, and relaying the delivery confirmation from the intended recipient's communication device to the first protocol server.

According to another aspect, a method for delivery confirmation of a short message includes sending the message in a first protocol format addressed to the intended recipient's communication device, relaying the message to the intended recipient user's communication device in a second protocol format, determining whether the intended recipient's communication device has returned a delivery confirmation in the second protocol format storing the message in a first protocol server if the delivery confirmation in the second protocol format has not been returned, receiving a notification that the intended recipient's communication device is available in a home location register, transmitting an alert from the home location register to the first protocol server after receiving the notification that the intended recipient's communication device is available, relaying the stored message from the first protocol server to the intended recipient's communication device after receiving the alert from the home location register, receiving the delivery confirmation from the intended recipient's communication device in the second protocol format, and relaying the delivery confirmation from the intended recipient's communication device to the first protocol server.

According to other aspects, communication systems and communication system components are configured to perform one or more of the foregoing methods.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

DETAILED DESCRIPTION

Figure 1:
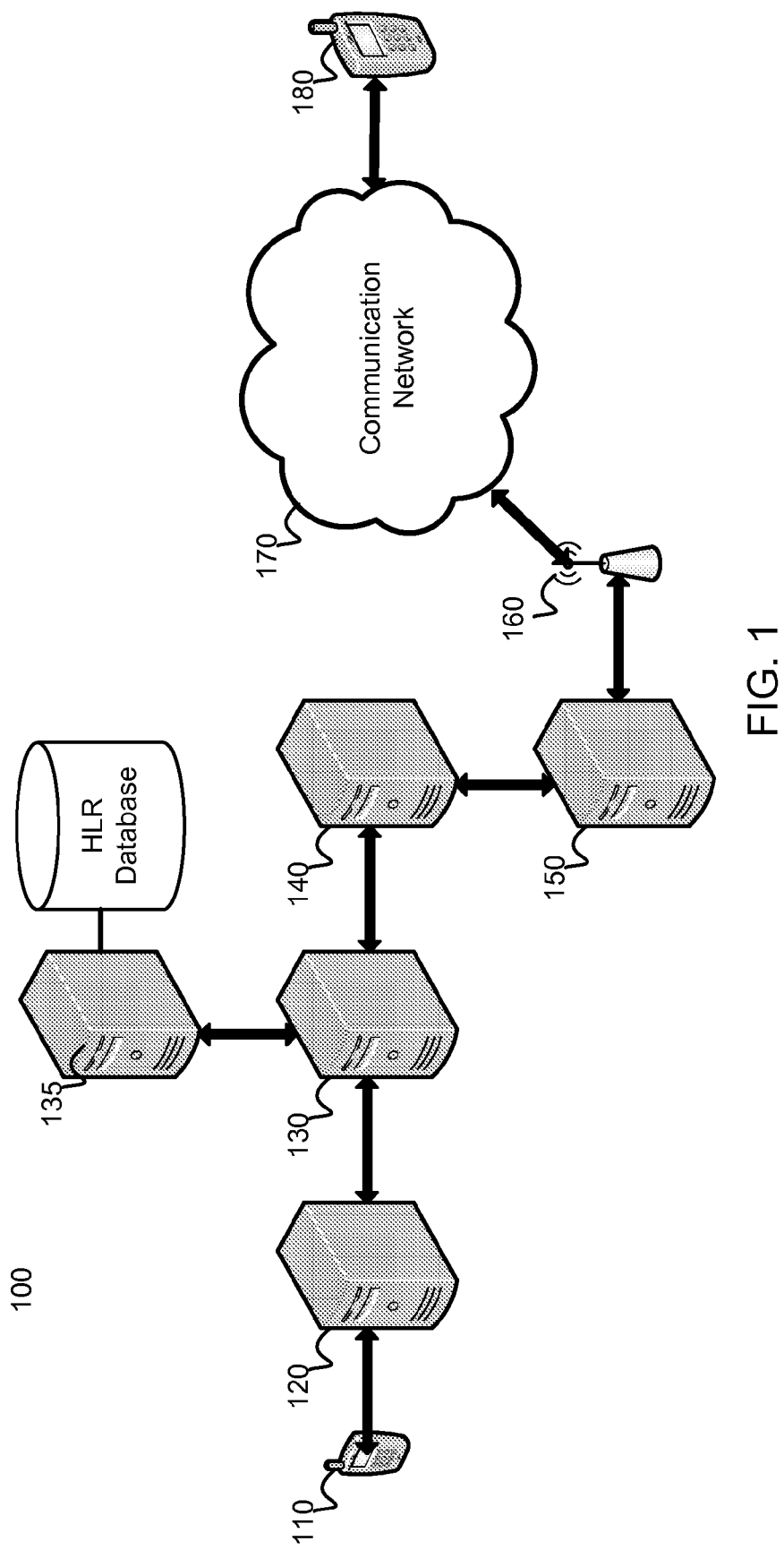
FIG. 1 is system block diagram of an example communication network system 100 which allows users to transmit messages across communication protocols to other users through their communication devices.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "communication device" and "mobile station" may refer to any one or all of cellular telephones, personal data assistants (PDA's), palm-top computers, laptop computers, wireless electronic mail receivers (e.g., the Blackberry® and Treo® devices), multimedia Internet enabled cellular telephones (e.g., the iPhone®), and similar personal electronic devices which include a programmable processor and memory. In a preferred embodiment, the communication device is a cellular handset that can communicate via a cellular telephone network (e.g., a cellphone) and is capable of sending and receiving SMS and/or IM messages. However, the various embodiments are not intended to be limited to such communication devices and cellular telephone systems. Indeed the various embodiments may be implemented using any type of communication device including desktop computers communicating through a communication network that uses protocol-to-protocol interface gateways, which may also be referred to as back-to-back user agent communication gateway. In a preferred embodiment, the communication system includes an instant message system protocol to short message system protocol (IP-SM-GW).

As used herein, the term "server" refers to any of a variety of commercially available computer systems configured to operate in a client-server architecture. In particular, the term "server" refers to network servers, particularly Internet accessible servers, which typically include a processor, memory (e.g., hard disk memory), and network interface circuitry configured to connect the server processor to the network, such as the Internet, an instant messaging network, a simple messaging system network and/or a cellular telephone network.

Disclosed are systems and methods for providing reliable delivery confirmation of messages that are communicated through a communication system that implements back-to-back user agent gateways. Protocol-to-protocol interface gateways or back-to-back user agent gateways may be implemented to enable a communication system to send and receive messages of different protocols (i.e., communication formats). An example is a communication system that allows messages to be sent from a non-store-and-forward communication system or protocol such as the Instant Messaging (IM) messaging protocol, to a store-and-forward communication system such as the SMS messaging protocol, and vice versa. A non-stored-and-forward communication system presumes the recipient is on-line or registered with the system so that a message (e.g., an IM) can be delivered directly without storing the message in an intermediary server. On the other hand, a store-and-forward communication system does not presume the recipient is on-line, and instead stores messages in an intermediary server where they are held until the recipient either requests message delivery or logs onto the communication system. When messages are delivered between two protocol systems which differ in delivery mechanisms or recipient registration presumptions the operation of a protocol-to-protocol interface gateway can cause delivery confirmation errors. Such errors may be caused by the receipt of a message in a storage server in one system which, by presumption, may be interpreted as a delivery confirmation by the other system. The various aspects reduce or eliminate this problem, thereby enabling reliable inter-protocol communications. According to one aspect, a method for delivery confirmation of a short message includes sending the message in a short message service protocol addressed to the intended recipient's communication device, relaying the message to the intended recipient user's communication device in an instant messaging protocol, determining whether the intended recipient's communication device has returned an instant messaging delivery notification (IMDN), and indicating delivery failure of the message if the instant messaging delivery notification has not been returned. According to another aspect, a method for delivery confirmation of a short message includes sending the message in a first protocol format addressed to the intended recipient's communication device, relaying the message to the intended recipient user's communication device in a second protocol format, determining whether the intended recipient's communication device has returned a delivery confirmation in the second protocol format, storing the message in a second protocol server if the delivery confirmation in the second protocol format has not been returned, subscribing to the second protocol server for notification of delivery confirmation in the second protocol format, receiving a notification that the intended recipient's communication device is available, relaying the stored message from the second protocol server to the intended recipient's communication device after receiving the notification that the intended recipient's communication device is available, receiving the delivery confirmation from the intended recipient's communication device in the second protocol format, and relaying the delivery confirmation from the intended recipient's communication device to the first protocol server. According to another aspect, a method for delivery confirmation of a short message includes sending the message in a first protocol format addressed to the intended recipient's communication device, relaying the message to the intended recipient user's communication device in a second protocol format, determining whether the intended recipient's communication device has returned a delivery confirmation in the second protocol format storing the message in a first protocol server if the delivery confirmation in the second protocol format has not been returned, receiving a notification that the intended recipient's communication device is available in a home location register, transmitting an alert from the home location register to the first protocol server after receiving the notification that the intended recipient's communication device is available, relaying the stored message from the first protocol server to the intended recipient's communication device after receiving the alert from the home location register, receiving the delivery confirmation from the intended recipient's communication device in the second protocol format, and relaying the delivery confirmation from the intended recipient's communication device to the first protocol server. According to other aspects communication systems and communication system components are configured to perform one or more of the foregoing methods.

FIG. 1 is an example communication network system 100 which allows users to transmit messages across communication protocols (such as IM to SMS protocols) to other users through their communication devices. In the illustrated example, a user may attempt to transmit a simple message from a communication network using a SMS message protocol to an intended recipient on a communication network using an instant messaging (IM) protocol. Referring to FIG. 1, a communication device 110 capable of generating and transmitting SMS messages as well as receiving SMS messages is in communication with a SMS service center 120. As discussed above, the communication device 110 may be a cellular telephone, for example, but the systems and methods may also apply to a stationary computing device such as a desktop computer. The computing device 110 and SMS service center 120 may be in communication with one another over a wired or wireless communication network (e.g., Internet, cellular communication network, PSDN, or hardwire link). In this example communication network, when a user sends a SMS message, the message is transmitted to the SMS service center 120 via the wired or wireless communication network for relay by the SMS service center 120 to the intended recipient user's communication device 180.

In order to route and establish a communication link between the intended recipient communication devices 110, 180, the SMS service center 120 communicates with a SMS-Gateway mobile switching center (SMS-GMSC) 130. The SMS service center 120 and SMS-GMSC 130 may be in communication with one another over another wired or wireless communication network (e.g., Internet, cellular communication network, PSDN, or hardwire link) (not shown). A SMS gateway may be used to provide a service that transforms messages to mobile network traffic from other communication networks, and vice versa, allowing transmission or receipt of SMS messages without the use of a mobile communication device. As an example, a typical use of a SMS-gateway would be to forward simple messages or e-mail to a recipient mobile communication device.

Referring to FIG. 1, the SMS-GMSC 130 receives the SMS message request from the SMS service center 120 and interrogates the home location register (HLR) 135 to determine the routing information necessary to complete the communication link with the intended recipient's communication device 180. The HLR 135 is a central storage server that contains details of each communication device subscriber that is authorized to use the wireless communication core network. The routing information may be contained within the memory units of the HLR 135 or within a HLR database 136 connected to the HLR 135. The SMS-GMSC 130 and HLR 135 may also be in communication with one another over a wired or wireless communication network (e.g., Internet, cellular communication network, PSDN, or hardwire link). Thus, by interrogating the HLR 135, the SMS-GMSC 130 may determine the wireless communication routing information to complete the communication link to pass a message between the initiating communication device 110 and the intended recipient's communication device 180. Once the proper routing information is determined through the HLR 135, the SMS-GMSC 130 may relay the SMS message to the instant message protocol to simple message system protocol interface gateway (IP-SM-GW) 140. As mentioned above, the IP-SM-GW provides the message format translations that enable simple messages to be relayed to a recipient as an instant message and instant messages to be relayed to a recipient as a SMS message.

The IP-SM-GW 140 accepts the SMS message from the SMS-GMSC 130 and serves as the interface between the instant message protocol networks that are more common among stationary devices and the SMS networks that are typically used on mobile communication networks. The IP- SM-GW 140 and SMS-GMSC 130 may be in communication with one another over a wired or wireless communication network (e.g., Internet, cellular communication network, PSDN, or hardwire link). The Instant Messaging (IM) server 150 accepts the converted short message from the IP-SM-GW 140 and relays it towards to the intended recipient communication device 180 as an IM. When the intended recipient communication device 180 is a wireless communication device, the communication link with the communication device 180 may be through a wireless communication network 170 via a base station system (BSS) 160 which accepts the converted short message from the IM server 150 and sends it to the wireless network 170. The wireless communication network 170 in turn relays the converted simple message to the intended recipient communication device 180.

In the illustrated communication network, where a protocol-to-protocol gateway such as the SMS-IM-GW 140 is implemented to serve as an interface between the SMS network and the IM network, the IM server 150 may send a 2xx (Success) type status message back to the IP-SM-GW 140 in response to receiving the converted simple message. As a result the IP-SM-GW 140 may generate and send a Delivery Acknowledgement to the initiating user's communication device 110. However, such a delivery status would not represent the correct state of message delivery since the intended recipient's communication device may be offline at the time. Consequently, the initiating user may wrongly assume that the SMS message was read by the intended recipient.

Figure 2:
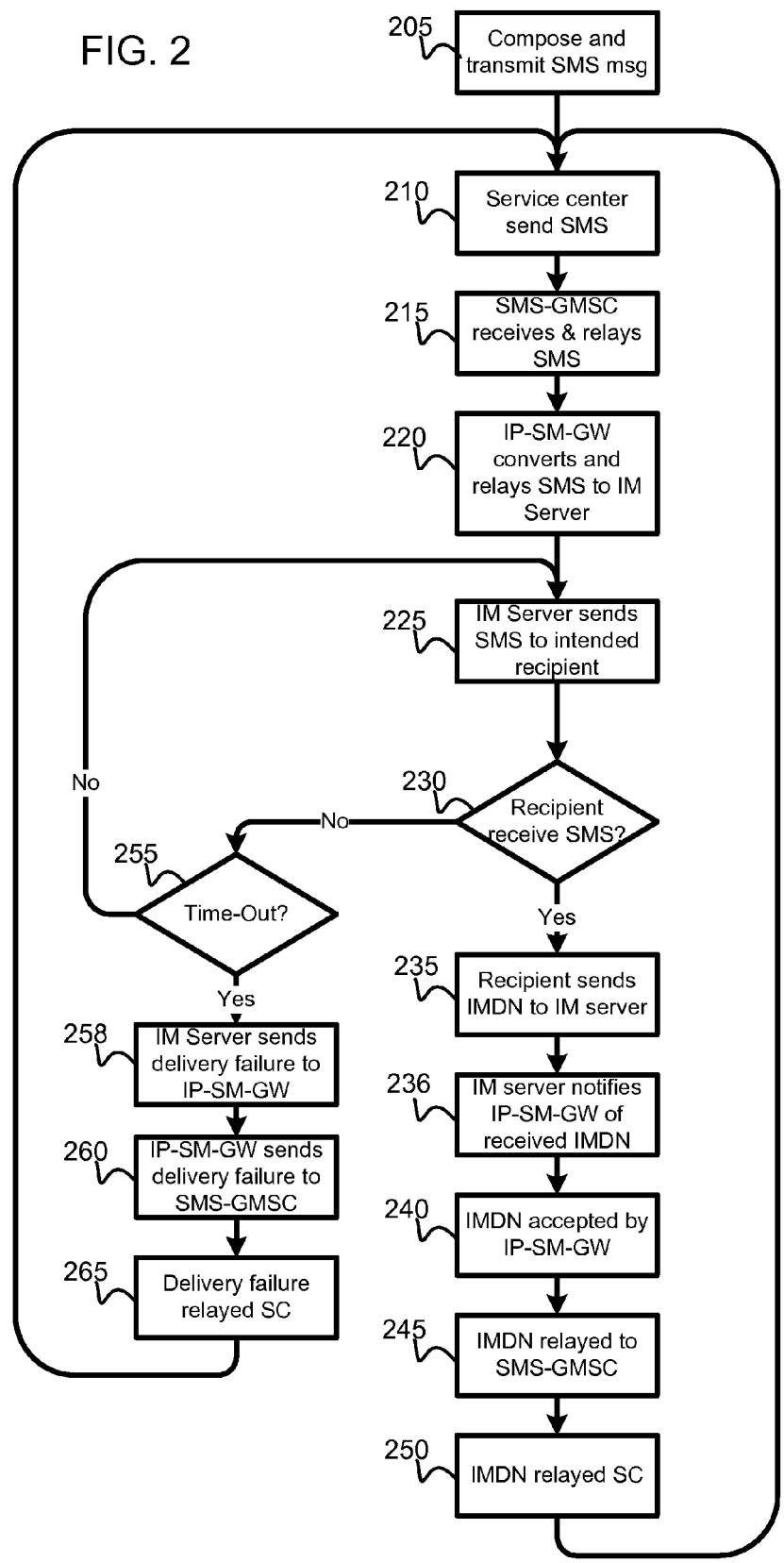
FIG. 2 is a process flow diagram of an embodiment method for providing an accurate message delivery confirmation in a communication system spanning two communication protocols.

To provide an accurate message delivery confirmation to the initiating user which reflects the actual delivery status a communication network system implementing a back-to-back user agent communication gateway may implement the embodiment method illustrated in FIG. 2. In this embodiment the intended recipient communication device 180 is operating within an IP multimedia system that supports instant messaging and, in accordance with the IM protocol, will generate an instant message delivery notification (IMDN) message when an IM message is received. An initiating user operating a communication device 110 within a SMS system composes and transmits a SMS message via the SMS service center 120, step 205. The SMS message is received by the SMS service center 120 which relays the SMS message to the SMS-GMSC 130, step 210. The SMS-GMSC 130 receives the SMS message, retrieves routing information for the intended recipient's communication device 180 by interrogating the HLR 135, and uses the routing information to relay the SMS message to the IP-SM-GW 140 that is in communication with the IM Server supporting the intended recipient's communication device 180, step 215.

The IP-SM-GW 140 converts the SMS message to the proper IM protocol format and relays the message to the IM server 150 supporting the intended recipient's communication device 180, step 220. If the recipient communication device 180 is logged onto the network of the IM server 150 the IM message may be promptly routed to the recipient in the ordinary manner defined by the IM protocol, step 225. The IM server 150 may buffer the converted SMS message before it is transmitted, or buffer the converted SMS message if the recipient communication device 180 is not logged onto the network of the IM server 150, and thus cannot receive the message immediately. The IM server 150 then can continue to store the SMS message until delivery of the converted SMS message can be made to the intended recipient's communication device 180. The IM server may continue to attempt to relay the converted SMS message to the intended recipient's communication device 180, step 225, or may relay the converted SMS message when the recipient's communication device 180 logs onto the network, step 225. The relay of the converted SMS message to the communication device 180 may occur via the base station 160 and wireless communication network 170. Alternatively, the relay of the converted SMS message to the communication device 180 may occur through a wired communication network (not shown) if the intended recipient's communication device 180 is in communication with the IM server 150 via a wired communication network.

If the intended recipient's communication device 180 is online and receives the converted SMS message (i.e., determination 230=Yes) the intended recipient user's communication device 180 sends an IMDN back to the IM server, step 235. In turn, the IM server sends an IMDN to the IP-SM-GW 140 via the communication network 170, base station 160 and IM server 150 to indicate that the message was actually delivered, step 236. The IMDN or an equivalent delivery notification message is accepted by the IP-SM-GW, step 240, and relayed on to the SMS-GMSC 130, step 245. The IMDN or equivalent delivery notification message is then relayed from the SMS-GMSC 130 to the SMS service center 120 as accurate confirmation of the delivery of the SMS message, step 250. With the message delivered, the system awaits the next SMS message sent by the initiating user's communication device 110.

If the intended recipient's communication device 180 is not online or does not receive the converted SMS message, the intended recipient user's communication device 180 will not send an IMDN to the IM server 150. Having failed to receive an IMDN the IM server 150 may determine that the SMS message has not been delivered to the recipient communication device 180 (i.e., decision 230=No). The converted SMS message may remain stored in the IM server 150 until delivery can be made. Optionally, the IM server 150 may keep track of the time that a converted simple message is held pending deliver so that old and presumably no longer relevant messages can be deleted, determination 255. If the intended recipient's communication device 180 is not online or does not receive the converted SMS message (i.e., determination 230=No) and if the message timer has not timed out (i.e., decision 255=No), the IM server 150 may continue to monitor the network for a login of the intended recipient's communication device 180. If, however, the time to deliver the message has expired (i.e., determination 255=Yes), IM server may send a delivery failure notification to the IP-SM-GW 140, step 258. In response, the IP-SM-GW 140 sends a delivery failure notification to the SMS-GMSC 130, step 260. The SMS-GMSC 130 in turn relays the delivery failure notification or an equivalent notification to the SMS service center 120, step 265. At this point, the system may await the next SMS message sent by the initiating user's communication device 110.

Figure 3:
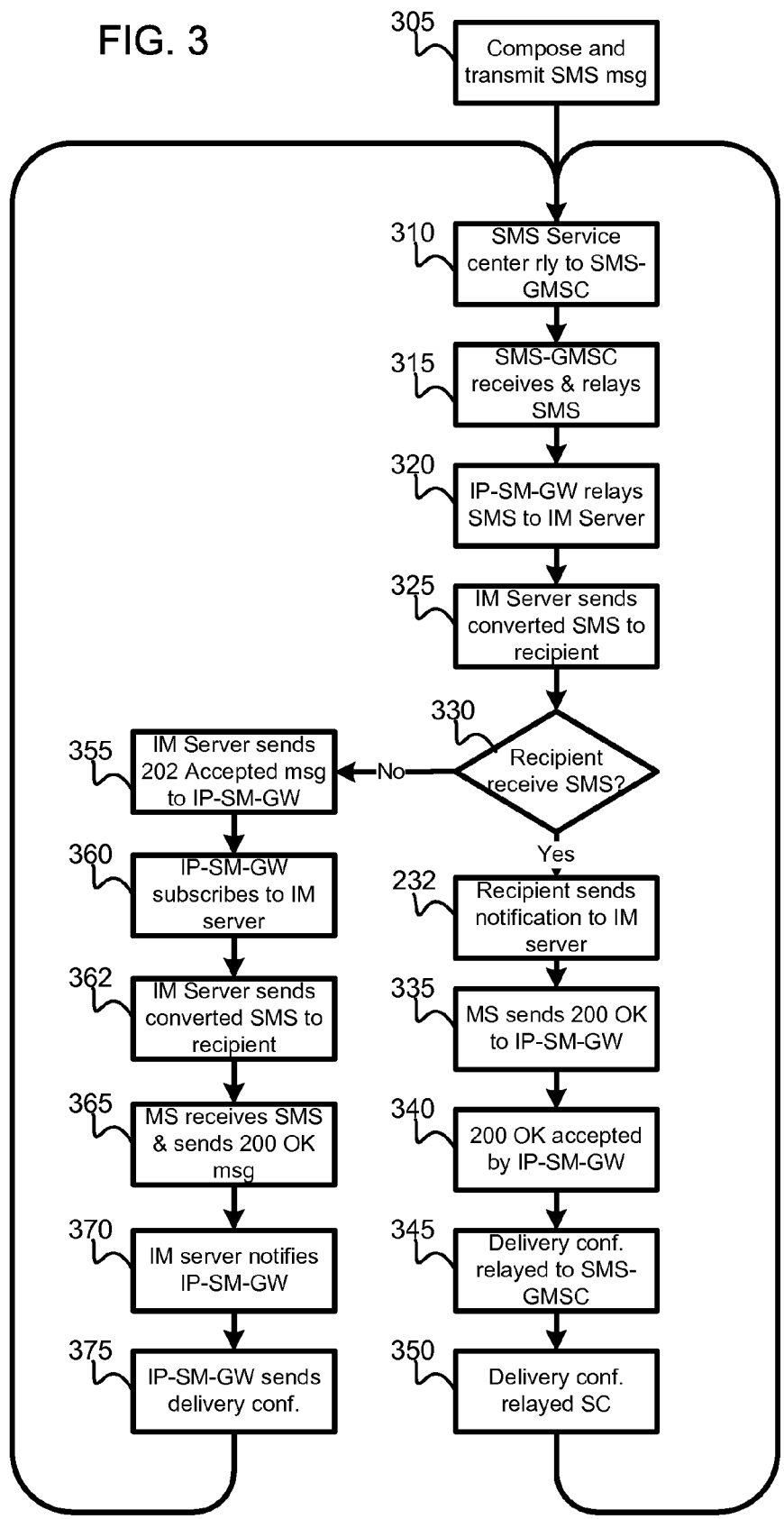
FIG. 3 is a process flow diagram of another embodiment method for providing an accurate message delivery confirmation in a communication system that implements a protocol interface gateway.
Figure 4:
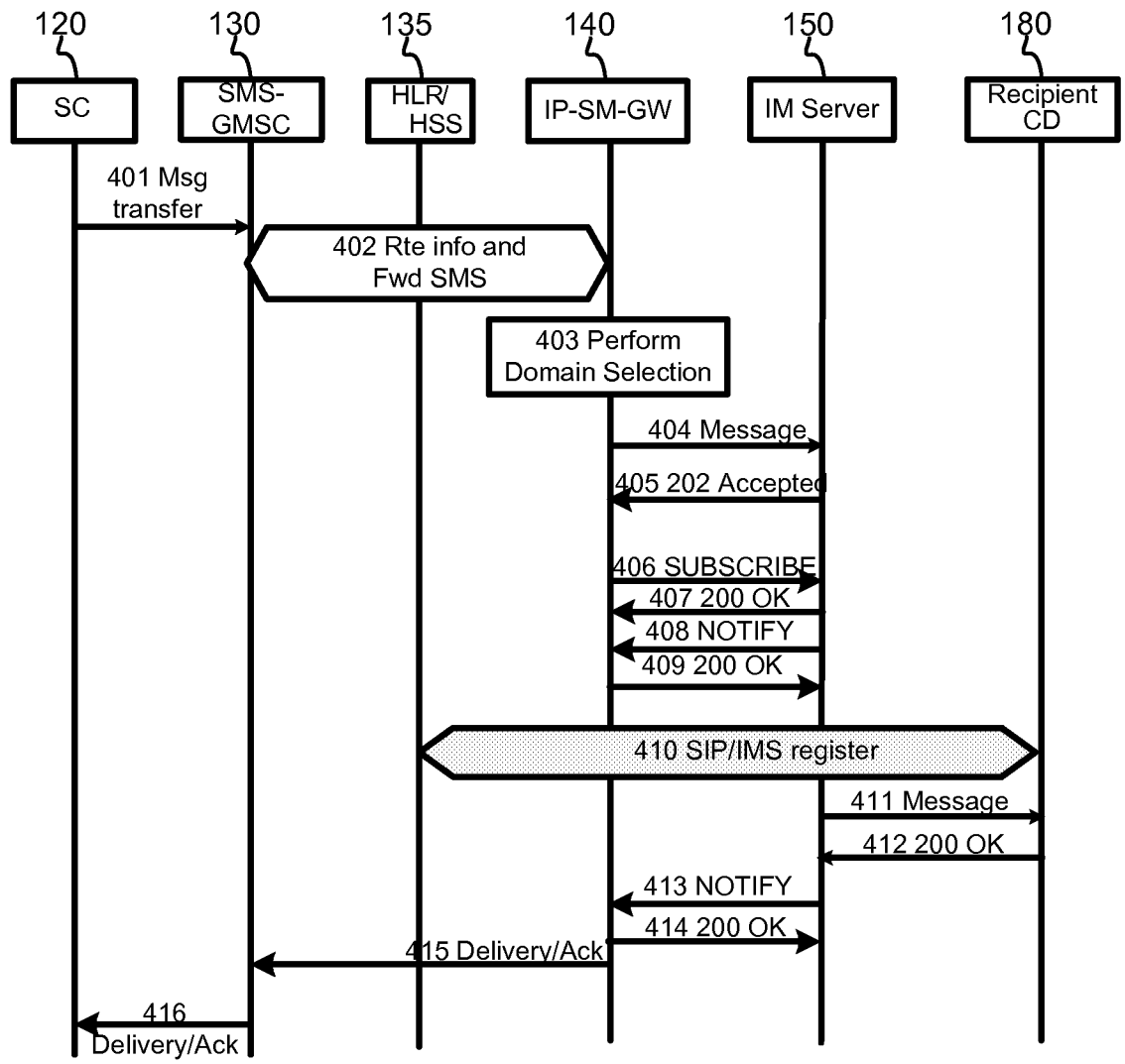
FIG. 4 is a message flow diagram illustrating the various messages that may be sent in an embodiment method for providing an accurate message delivery confirmation in a communication system implementing a protocol-to-protocol agent gateway.

FIG. 3 is a process flow diagram of an alternative embodiment method for providing an accurate message delivery confirmation in a communication system that implements a protocol interface gateway. FIG. 4 is a message flow diagram illustrating the various messages that may be sent in an embodiment method for providing an accurate message delivery confirmation in a communication system implementing a protocol-to-protocol agent gateway.

Referring to both FIGS. 3 and 4, when a user wishes the send a SMS message from the user's communication device 110 to an intended recipient's communication device 180, the initiating user composes and transmits the SMS message via a SMS service center 120 supporting the initiating user's communication device 110, step 305. The SMS service center 120 receives the SMS message from the initiating user's communication device 110 and relays the SMS message to the SMS-GMSC 130, step 310, message 401. Upon receipt, the SMS-GMSC 130 queries the HLR 135 to determine which IP-SM-GW 140 and IM Server 150 must be connected with to properly relay the SMS message to the intended recipient. Using the routing information from the HLR 135, the SMS-GMSC 130 relays the routing information and SMS message to the IP-SM-GW 140, step 315, message 402. As part of this process the IP-SM-GW 140 also converts the SMS message into IM protocol format. The IP-SM-GW 140 may also perform a domain selection which makes a determination regarding the network location of the end user, message 403. For example, if the intended recipient user's communication device 180 is using a particular protocol (e.g., IM protocol as in the example illustrated in FIGS. 3 and 4), the IP-SM-GW 140 may optionally select to implement the protocols of the selected domain.

The IP-SM-GW 140 relays the converted SMS message to the IM server 150 supporting the intended recipient's communication device 180, step 320, message 404. The IM server 150 receives the converted SMS message, buffers it (i.e., stores it in memory), and attempts to relay the message to the intended recipient communication device 180, step 325.

In conventional communication systems, when the IM server 150 receives the converted SMS message it will automatically generate a 202 "Accepted" message which indicates that the message was accepted by the IM server 150. Typically, the 202 "Accepted" message is used to confirm deliver of an IM message. However, in this situation the generation of the 202 "Accepted" message by the IM server 150 will give rise to a false delivery confirmation. This is because in a conventional IM server 150 environment the two endpoints are linked to conduct a synchronous communication (i.e., both users are on the communication link and communicating in real time). Thus, the 202 "Accepted" message is typically sent by the IM server 150 to indicate that the synchronous IM message was delivered to the recipient communication device. However, in the cross protocol communication system messaging situation, the initiating user sends an asynchronous communication (i.e., SMS message) in which the intended recipient communication device 180 is not linked to the initiating user's communication device 110 in real time. Thus, true delivery of the message will not occur until the intended recipient communication device 180 registers with the IM server 150 or another element of the communication network 100.

When the intended recipient user's communication device 180 is not registered with the communication network 100 then an IMDN or similar delivery notification message (e.g., 200 OK message) will not be received from the communication device 180. When no IMDN or similar message is received by the IM server 150 (i.e., determination 330=No), the IM server 150 sends an 202 "Accepted" message to the IP-SM-GW 140, step 355, message 405. Upon receiving the 202 "Accepted" message, the IP-SM-GW 140 subscribes to the IM server 150, step 360, message 406. By subscribing to the IM server 150, the IP-SM-GW 140 can be alerted by the IM server 150 when the intended recipient's communication device 180 registers with the IM server 150 or other element of the communication network 100, message 410. To accomplish the subscription process, a series of IP messages may be sent and received between the IM server 150 and IP-SM-GW 140. The IM server 150 may acknowledge the subscription request (message 406) with a 200 OK message (message 407). Meanwhile the SMS message remains buffered in the IM server 150 until it can be delivered to the recipient communication device 180.

When the intended recipient communication device 180 registers with the IM server 150 or other element of the communication network 100, message 410, the IP-SM-GW 140 may be notified of this registration, message 408. In response the IP-SM-GW 140 returns a 200 OK message to the IM server 150, message 409. Once the communication device 180 has registered with the communication network 100, the IM server 150 may relay the SMS message to the communication device 180, step 362, message 411. Upon receiving the SMS message, the recipient communication device 180 may return a 200 OK message to the IM server 150 to indicate true delivery of the SMS message, step 365, message 412. The IM server 150 in turn relays the delivery confirmation to the IP-SM-GW 140 via a notification message, step 370, message 413. The IP-SM-GW 140 relays the delivery confirmation as a delivery acknowledgement to the SMS-GMSC 130, step 375, message 415. This delivery acknowledgement is relayed to the SMS service center 130, message 416. Once delivery confirmation is received by the SMS service center 120, the SMS service center 120 may await the next SMS message from the various communication devices 110 communicating with it.

The intended recipient communication device 180 can with the IM server 150 or other element of the communication network 100 by sending an IP Multimedia Subsystem (IMS) registration message, message 410, via the IM server 150 or by sending a Session Initiation Protocol (SIP) registration message, message 410, via the SMS-GMSC 130. When the recipient communication device 180 is registered with the IM server 150, message 410, the converted SMS message will be delivered to the recipient communication device 180 directly from the IM server 150, step 325, message 411. In this situation the recipient communication device 180 will send the 200 OK message to the IM server 150, step 335, message 412. The IM server 150 forwards a 200 OK message, IMDN or similar delivery notification to the IP-SM-GW 140, step 355, message 413. The 200 OK message, IMDN or similar delivery notification may be accepted and acknowledged by the IP-SM-GW 140, step 340, message 414, and relayed to the SMS-GMSC, step 345, message 415, which relays the notification on to the SMS service center 120, step 350, message 416. Once the delivery confirmation is received by the SMS service center 120, the SMS service center 120 may await the next SMS message from the various communication devices 110 communicating with it.

The example shown in FIGS. 3 and 4 utilize a Session Initiation Protocol (SIP) to conduct the messaging between the IP-SM-GW 140 and the IM server 150. However, other protocols may be used such as IP Multimedia Subsystem (IMS). Any protocol, including a proprietary protocol, which allows the IP-SM-GW 140 to subscribe to the IM server 150 and obtain notification of delivery status may be used.

Figure 5:
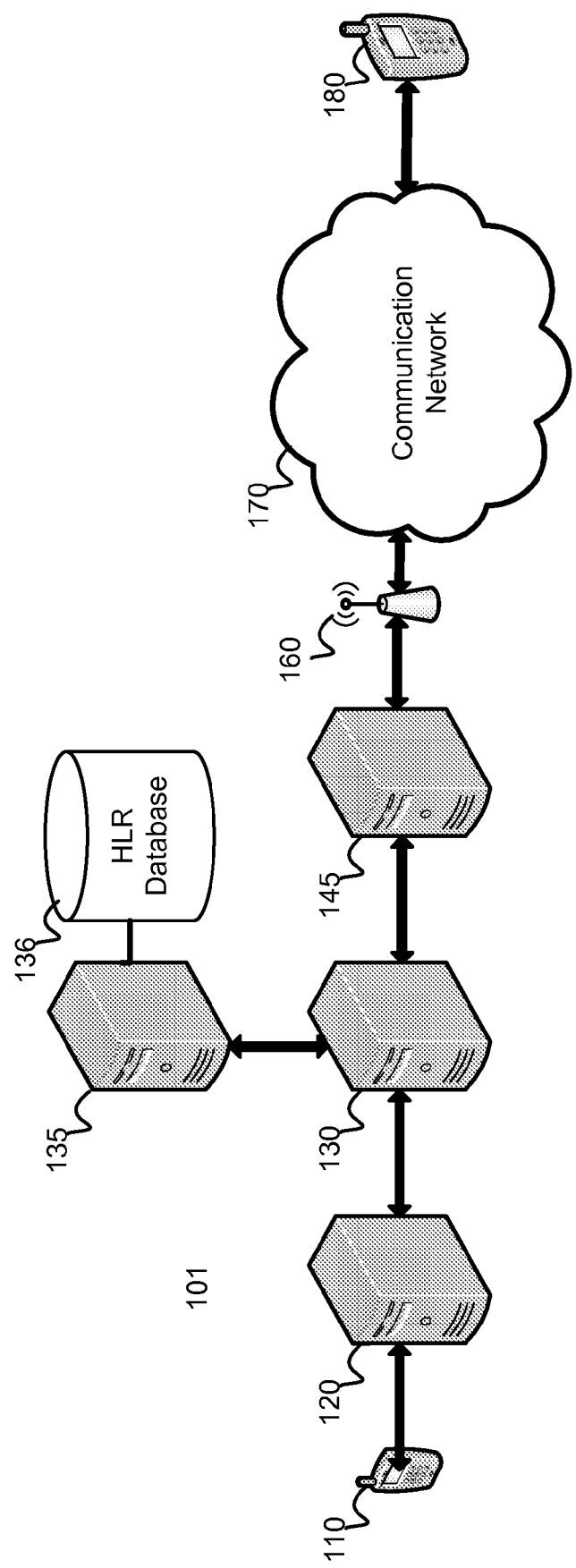
FIG. 5 is a system block diagram of an alternative example communication network system 100 which allows users to transmit messages across communication protocols via a consolidated IP-SM-GW/IM server unit.

FIG. 5 is a system block diagram of an alternative example communication network system 101 which uses a consolidated IP-SM-GW/IM server unit to enable users to transmit messages across communication protocols to other users through their communication devices. In the communication system in FIG. 5, the IP-SM-GW 140 and IM server 150 of FIG. 1 have been consolidated into a single IP-SM-GW/IM Server unit 145. The other elements shown in FIG. 5 correspond to the same number components described above with reference to in FIG. 1 and thus, their descriptions are not repeated here. In the communication system illustrated in FIG. 5, no 2xx type status message are generated except for the 200 OK message which is generated by recipient communication device 180, message 412. If the 200 OK message (message 412) is received by the IP-SM-GW, the is notified via a delivery report of the successful delivery.

Figure 6:
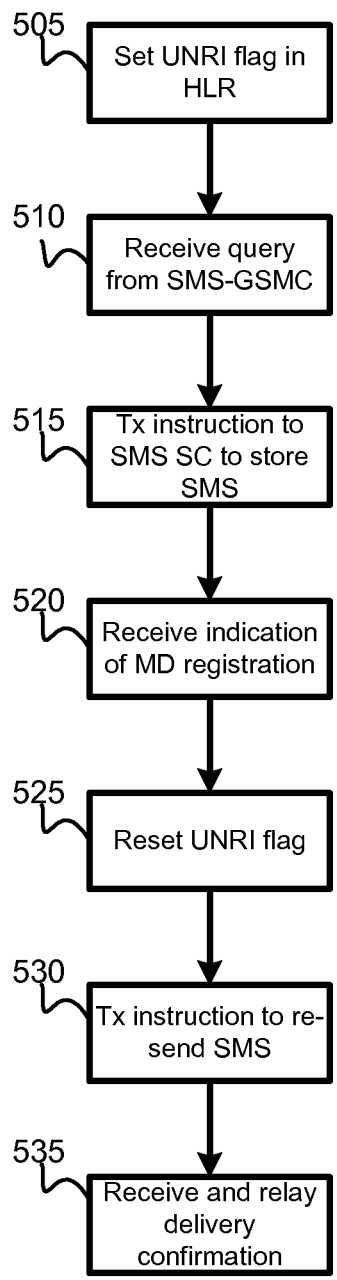
FIG. 6 is a process flow diagram illustrating steps of an alternative embodiment method which stores a SMS message intended for a recipient communication device that is not currently registered with the communication network.

In an alternative embodiment, the SMS message may be buffered by the SMS service center 120 as opposed to the IM server 150 (or IP-SM-GW/IM Server consolidated unit 145) until the intended recipient's communication device 180 registers with the communication network 100. FIG. 6 is a process flow diagram illustrating steps of this alternative embodiment method which stores a SMS message intended for a recipient communication device that is not currently registered with the communication network until the message can be delivered. When a communication device 180 disconnects from the communication network 100, a user not registered indication (UNRI) flag may be set indicating that the intended recipient user's communication device 180 is currently not registered with the communication network 100 and therefore unreachable by IP. For example, this non-registered flag may be set in the HLR 135, step 505. The HLR 135 is a central store that contains details of each communication device subscriber that is authorized to use the wireless communication core network. Each time an initiating user's communication device 110 attempts to send a SMS message to an intended recipient communication device 180, the SMS-GMSC 130 interrogates the HLR 135 to obtain the routing information needed to establish a communication link with the communication device 180 (See e.g., FIG. 3, step 315). Thus, when the HLR 135 receives queries from the SMS-GMSC 140 regarding the recipient communication device 180, step 510, the HLR 135 may check the recipient registration flag and inform the SMS-GMSC 130 that the recipient is not currently registered or transmit an instruction to the SMS-GMSC 130 to be relayed to the SMS service center 120 thereby notifying the SMS service center 120 to store the SMS message in memory, step 515.

When the recipient communication device 180 registers with the communication network 100 (e.g., via the IM server 150 or the IP-SM-GW/IM server consolidated unit 145), the HLR 135 is informed of the registration, step 520. Upon receiving the indication that the communication device 180 has registered with the communication network 100, the HLR 135 may reset the UNRI flag to indicate that the communication device 180 is now registered and thus able to receive an IM message, step 525. In addition, the HLR 135 (or the IM server 150 or the IP-SM-GW/IM server receiving the registration) may transmit an instruction to the SMS service center 120 via the SMS-GMSC 130 to retransmit the SMS message to the recipient communication device 180, step 530. After the SMS message is sent and received by the intended recipient communication device 180, a delivery confirmation is generated by the recipient communication device 180 which is relayed to the SMS service center in a manner similar to processes and messages described above with reference to FIGS. 2-4, step 535.

Figure 7:
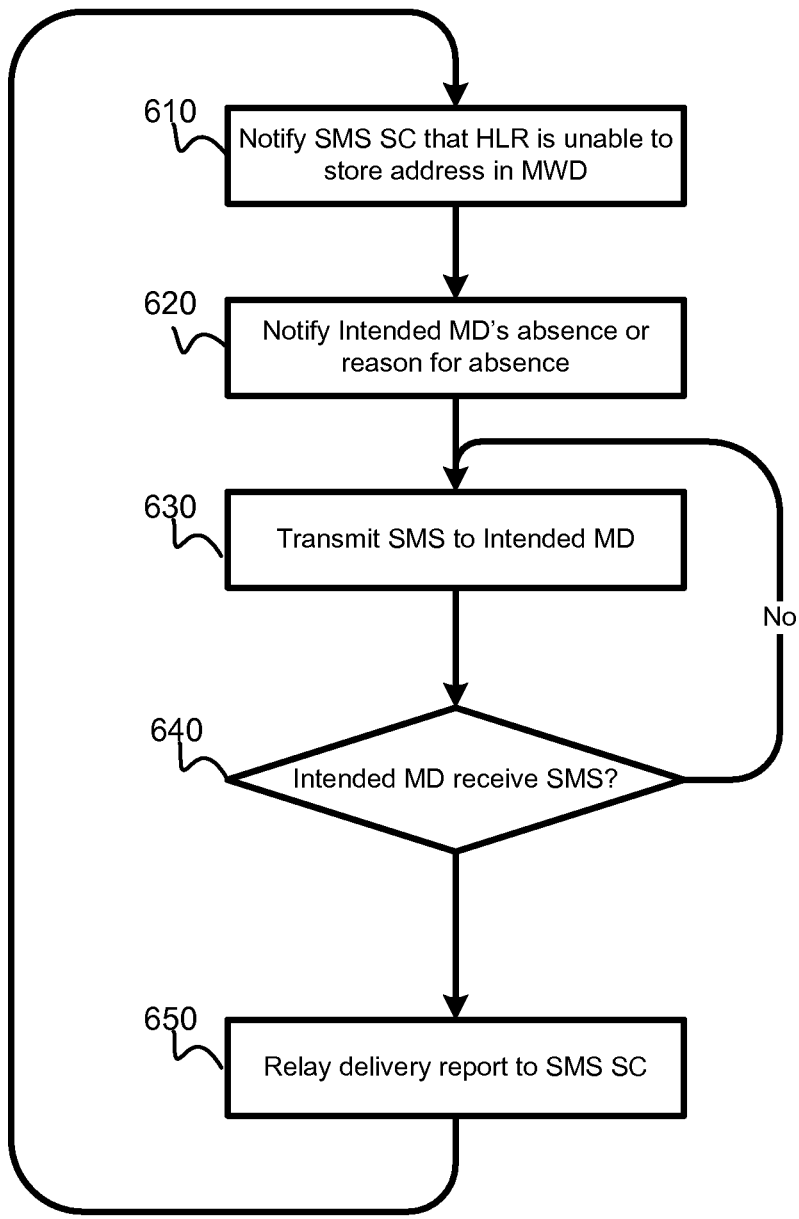
FIG. 7 is a process flow diagram illustrating steps of another alternative embodiment method which stores a SMS message intended for a recipient communication device that is not currently registered with the communication network.

In an alternative embodiment, the SMS message may be buffered by the SMS service center 120 instead of the IM server 150 (or IP-SM-GW/IM Server consolidated unit 145). In this alternative the HLR 135 may not implement a UNRI flag as described above with reference to FIG. 6. FIG. 7 is a process flow diagram illustrating steps of this alternative embodiment in which the SMS message is buffered by the SMS service center 120 but the HLR does not implement the UNRI flag. In this alternative embodiment, the SMS service center 120 is notified that the HLR 135 is unable to store the address of the intended recipient communication device 180 in the message waiting data (MWD), step 610. The HLR 135 may not be able to store the address of the intended recipient communication device 180 in the MWD because the communication device 180 is offline or not currently registered with the communication network system 100. If the cause of the delivery failure is Absent Subscriber, the SMS service center 120 is notified that the intended recipient communication device 180 is absent, step 620. The SMS service center 120 may retransmit the short message periodically until the SMS message reaches the intended recipient communication device 180 or the message expires, step 630. After each attempt to retransmit the short message, the communication system determines if the short message reaches the intended recipient communication device 180, decision 640. If the short message is properly received by the intended recipient user's communication device 180 (i.e., decision 640=Yes), the IP-SM-GW 140 relays a successful delivery report back to the SMS service center 120, step 650. Once the delivery report is received, the SMS service center 120 may await the next SMS message for transmission, returning to step 610.

If, however, the short message does not reach the intended recipient communication device 180 (i.e., decision 640=No), the SMS service center 120 continues to periodically transmit the SMS message to the intended recipient communication device 180, repeating step 630.

Figure 8:
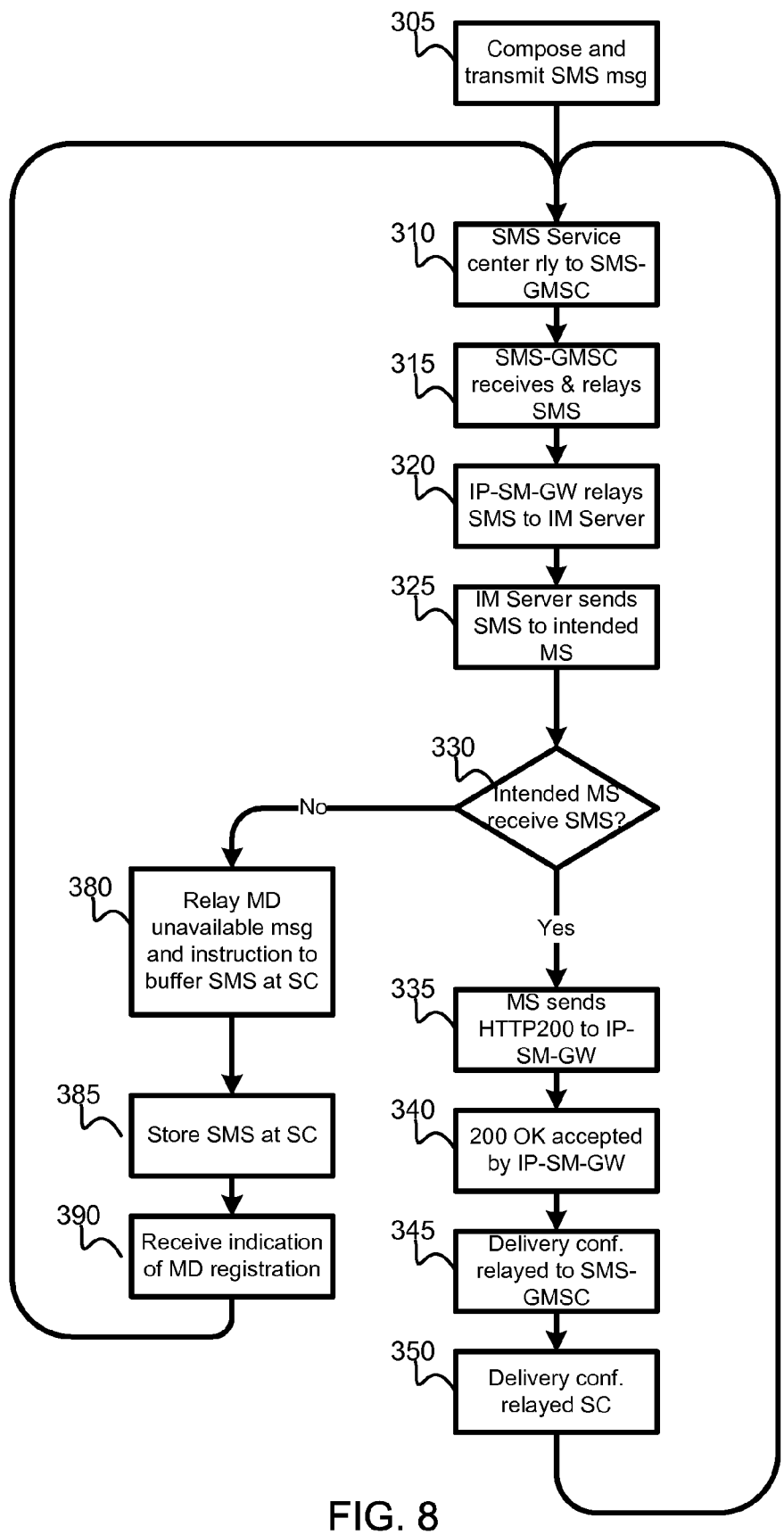
FIG. 8 is a process flow diagram illustrating steps of yet another alternative embodiment method which stores a SMS message intended for a recipient communication device that is not currently registered with the communication network.

In another alternative embodiment, the SMS message may be buffered by the SMS service center 120 until the intended recipient communication device 180 registers with the communication network 100. However, in this alternative embodiment the HLR 135 may not implement a UNRI flag. FIG. 8 is a process flow diagram illustrating steps of another alternative embodiment method which stores a SMS message intended for a recipient communication device that is not currently registered with the communication network. The alternative embodiment shown in FIG. 8 does not implement the UNRI flag as in the embodiment method of FIG. 6 and is similar to the process flow depicted in FIG. 3. In particular, steps 305-350, which transmit the SMS message from the initiating user's communication device 110 to the intended recipient communication device 180 when both the initiating user's communication device 110 and the intended recipient communication device 180 are registered with the communication network 100, may be repeated.

Figure 9:
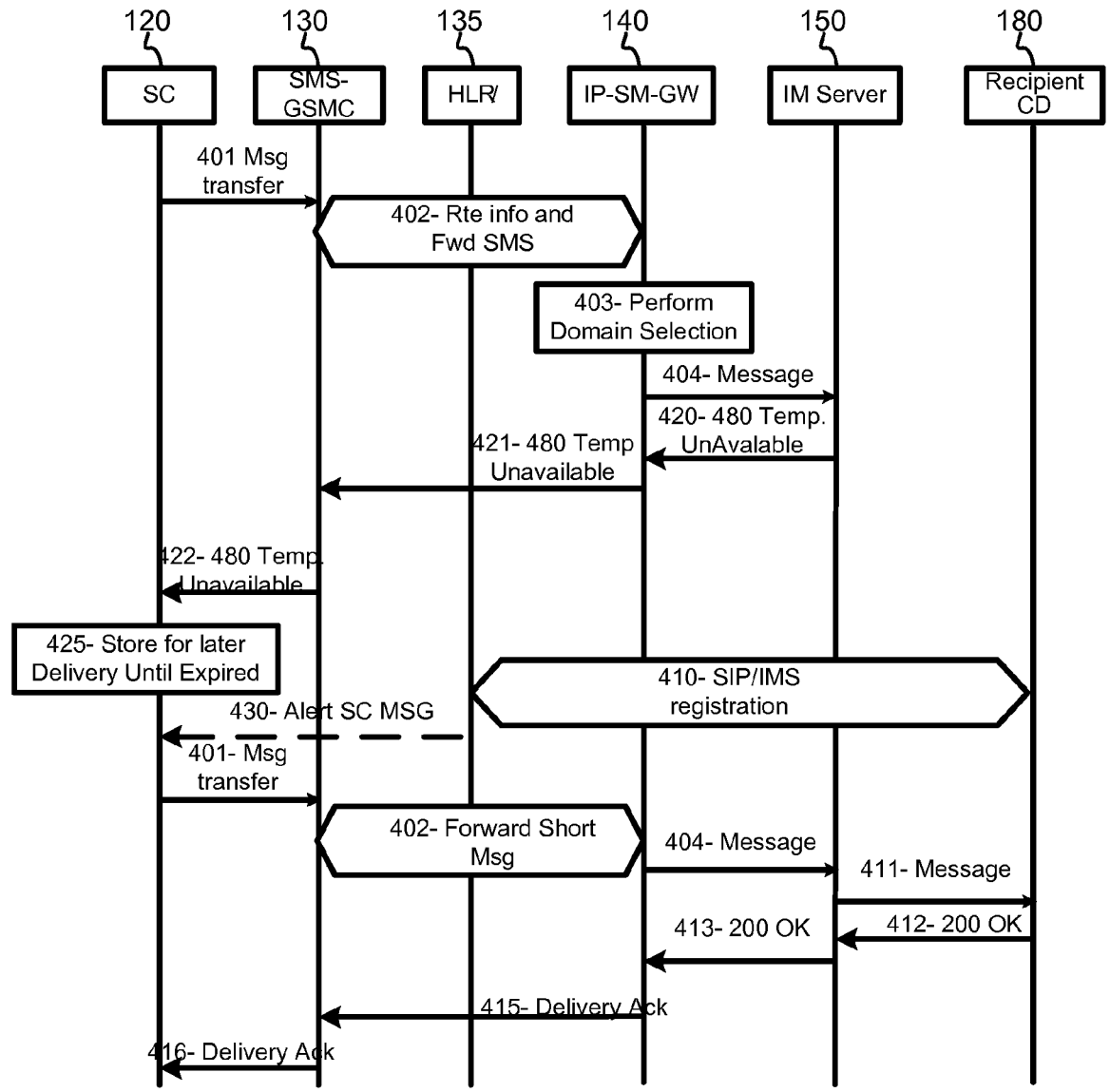
FIG. 9 is a message flow diagram illustrating the various messages sent in another alternative embodiment method illustrated in FIG. 8.

FIG. 9 is a message flow diagram illustrating the various messages sent in the alternative embodiment method illustrated in FIG. 8. In the event both the initiating user's communication device 110 and the intended recipient communication device 180 are registered with the communication network 100 the same series of messages may be generated, sent and/or relayed as those shown in FIG. 4. However, upon relaying the SMS message from the IP-SM-GW 140 to the IM server 150, a 480 message indicating that the intended recipient user's communication device 180 is temporarily unavailable may be transmitted, message 480. If the 480 message is received, indicating that the intended recipient user's communication device 180 did not receive the SMS message (i.e., decision 330=No), the 480 message may be relayed back to the SMS service center 120 via the IP-SM-GW 140 and SMS-GMSC 130 with an instruction to buffer and store the SMS message at the SMS service center 120, step 380, messages 420, 421, 422, and 425. In response to receiving the 480 message and instructions to buffer the SMS message, the SMS service center 120 stores the SMS message in memory, step 385. When the intended recipient communication device 180 registers with the communication network 100, message 410, the SMS service center 120 may be notified of the registration, step 390, message 430. As a result the SMS service center 120 may retransmit the SMS message, steps 305-350, messages 401-404 and 411-416.

While the illustrated examples disclosed refer to the interface between a SMS communication protocol and an IM communication protocol, the various embodiments are not limited to such an application. Similar false delivery confirmation may result in any communication network in which a back-to-back user agent is employed to serve as an interface between two varying communication protocols. For example, such a situation may arise when communicating message from one service provider to another which uses a different wireless communication technology (e.g., CDMA v. GSM).

Figure 10:
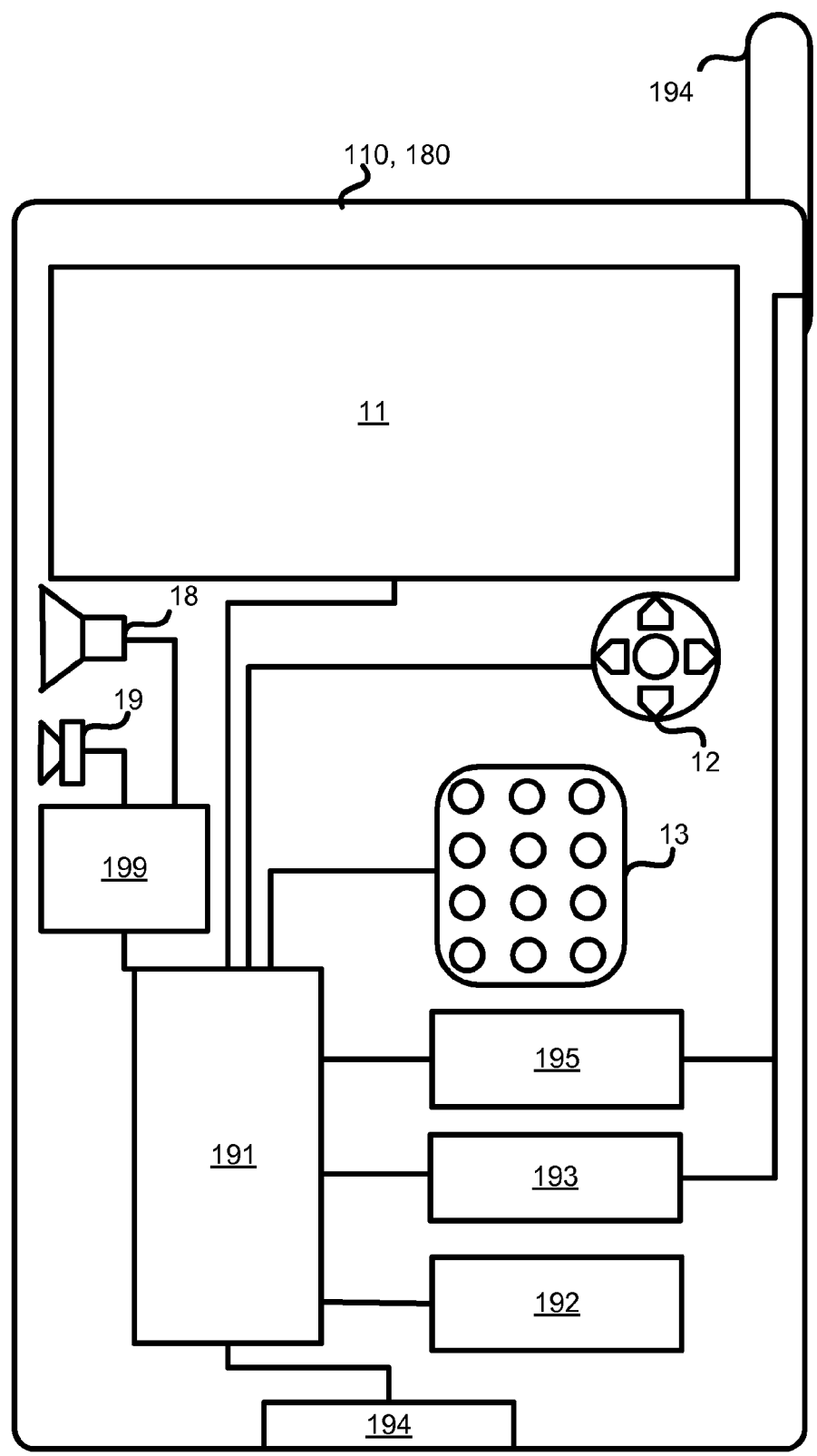
FIG. 10 a system block diagram of a communication device suitable for use with the various embodiments.

The embodiments described above may be implemented on any of a variety of communication devices, such as, for example, cellular telephones, personal data assistants (PDA) with cellular telephone and/or WIFI transceivers, mobile electronic mail receivers, mobile web access devices, laptop computers, palmtop computers and other processor-equipped devices. In addition, the various embodiments disclosed herein may be implemented by any processor-equipped device including stationary desktop computers. Typically, such portable computing devices will have in common the components illustrated in FIG. 10. For example, the communication device 110 or 180 may include a processor 191 coupled to internal memory 192 and a display 11. Additionally, the communication device 110, 180 may have an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications is referred to as the air interface since it provides a data interface via a wireless data link. Communication devices 10 also typically include a key pad 13 or miniature keyboard and menu selection buttons or rocker switches 12 for receiving user inputs. The processor 191 may further be connected to a vocoder 199 which is in turn connected to a microphone 19 and speaker 18. The communication device may also include a GPS receiver circuit 193 which is configured to receive signals from GPS satellites to determine the precise global position of the communication device 110, 180. The communication device 110, 180 may also include a wired network interface 194, such as a universal serial bus (USB) or FireWire® connector socket, for connecting the processor 191 to an external computing device such as a personal computer or external local area network.

The processor 191 may be any programmable microprocessor, microcomputer or multiple processor chip or chips that can be configured by software instructions (applications) to perform a variety of functions, including the functions of the various embodiments described above. In some communication devices 10, multiple processors 191 may be provided, such as one processor dedicated to wireless communication functions and one processor dedicated to running other applications. Typically, software applications may be stored in the internal memory 192 before they are accessed and loaded into the processor 191. In some communication devices 110, 180, the processor 191 may include internal memory sufficient to store the application software instructions. For the purposes of this description, the term memory refers to all memory accessible by the processor 191, including internal memory 192 and memory within the processor 191 itself. In many communication devices 10, the memory 192 may be a volatile or nonvolatile memory, such as flash memory, or a mixture of both.

Figure 11:
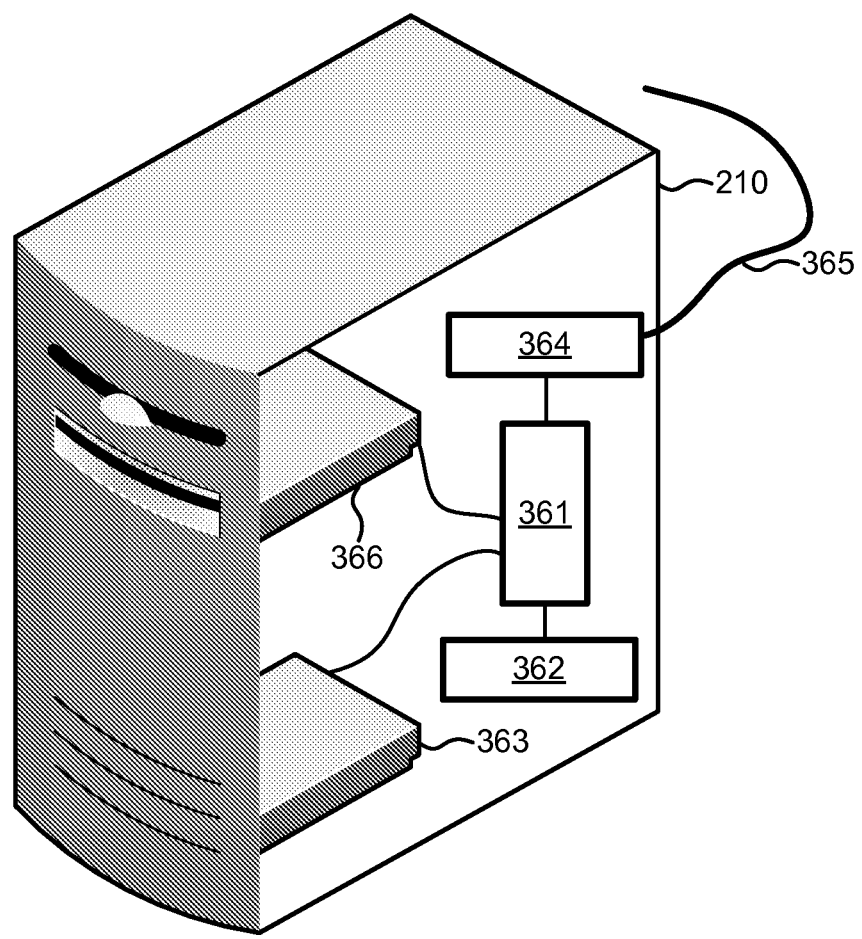
FIG. 11 is a circuit block diagram of an example remote server suitable for use with the various embodiments.

A number of the embodiments described above may also be implemented with any of a variety of remote server devices, such as the server 210 illustrated in FIG. 11. Such a remote server 210 typically includes a processor 361 coupled to volatile memory 362 and a large capacity nonvolatile memory, such as a disk drive 363. The server 210 may also include a floppy disc drive and/or a compact disc (CD) drive 366 coupled to the processor 361. Typically, the server 210 may also include a user input device like a keyboard (not shown) and a display (not shown). The server 210 may also include a number of connector ports coupled to the processor 361 for establishing data connections or receiving external memory devices, such as USB or FireWire® connector sockets or other network connection circuits 365 for coupling the processor 361 to a network 205.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method for providing an accurate delivery confirmation of a message, comprising:
   receiving in a short message to instant messaging interface gateway a message in a short message service protocol addressed to a recipient communication device;
   relaying the message to the recipient communication device in an instant messaging protocol via an instant messaging server;
   determining at the instant messaging server whether the recipient communication device has returned an instant messaging delivery notification (IMDN) before indicating delivery success of the message or delivery failure of the message from the instant messaging server to the short message service to instant messaging interface gateway;
   indicating delivery success of the message from the instant messaging server to the short message service to instant messaging interface gateway upon determining the instant messaging delivery notification has been returned;
   indicating delivery failure of the message from the instant messaging server to the short message service to instant messaging interface gateway upon determining the instant messaging delivery notification has not been returned;
   delaying sending any indication of delivery of the message to the recipient communication device from the short message service to instant messaging interface gateway until after the indication of the delivery success of the message or the indication of the delivery failure of the message is received from the instant messaging server at the short message service to instant messaging interface gateway;
   storing the message in the instant messaging server;
   subscribing the short message service to instant messaging interface gateway to the instant messaging server so that short message service to instant messaging interface gateway can receive notification of the instant messaging delivery notification; and
   wherein subscribing the short message service to instant messaging interface gateway to the instant messaging server is part of an IMS procedure.

2. The method of claim 1, wherein subscribing the short message service to instant messaging interface gateway to the instant messaging server is part of a SIP procedure.

3. The method of claim 1, wherein the instant messaging delivery notification is a 202 Accepted message.

4. The method of claim 1, further comprising: storing the message in a short messaging service server; receiving an indication that the recipient communication device is available;
   sending an alert to the short messaging service server indicating that the recipient communication device is available; and
   sending the short message from the short messaging service server in response to the alert.

5. The method of claim 1, further comprising: storing the message in a short messaging service server; determining a presence of the recipient communication device on a network; retransmitting the message from the short message service server; and
   relaying the instant messaging delivery notification to the short message service server if the message is received by the recipient communication device.

6. A communication network system spanning two communication protocols comprising:
   means for receiving in a short message service to instant messaging interface gateway a message in a short message service protocol addressed to a recipient communication device; means for relaying the message to the recipient communication device in an instant messaging protocol via an instant messaging server;
   means for determining at the instant messaging server whether the recipient communication device has returned an instant messaging delivery notification (IMDN) before indicating delivery success of the message or delivery failure of the message from the instant messaging server to the short message service to instant messaging interface gateway;
   means for indicating delivery success of the message from the instant messaging server to the short message service to instant messaging interface gateway upon determining the instant messaging delivery notification has been returned;
   means for indicating delivery failure of the message from the instant messaging server to the short message service to instant messaging interface gateway upon determining the instant messaging delivery notification has not been returned;
   means for delaying sending any indication of delivery of the message to the recipient communication device from the short message service to instant messaging interface gateway until after the indication of the delivery success of the message or the indication of the delivery failure of the message is received from the instant messaging server at the short message service to instant messaging interface gateway;
   means for storing the message in the instant messaging server;
   means for subscribing the short message service to instant messaging interface gateway to the instant messaging server so that short message service to instant messaging interface gateway can receive an indication of the instant messaging delivery notification; and
   wherein the means for subscribing the short message service to instant messaging interface gateway to the instant messaging server performs the subscribing as part of an IMS procedure.

7. The communication network system spanning two communication protocols of claim 6, wherein the means for subscribing the short message service to instant messaging interface gateway to the instant messaging server performs the subscribing as part of a SIP procedure.

8. The communication network system spanning two communication protocols of claim 6, wherein the instant messaging delivery notification is a 202 Accepted message.

9. The communication network system spanning two communication protocols of claim 6 further comprising:
   means for storing the message in a short messaging service server; means for receiving an indication that the recipient communication device is available;
   means for sending an alert to the short messaging service server indicating that the recipient communication device is available; and means for sending the short message from the short messaging service server in response to the alert.

10. The communication network system spanning two communication protocols of claim 6 further comprising:
means for storing the message in a short messaging service server;
means for determining a presence of the recipient communication device on a network; means for retransmitting the message from the short message service server; and
means for relaying the instant messaging delivery notification to the short message service server if the message is received by the recipient communication device.

* * * * *